(12) United States Patent
Natrajan et al.

(10) Patent No.: US 9,143,432 B2
(45) Date of Patent: Sep. 22, 2015

(54) EXPANDER-TARGETED ZONED BROADCAST

(75) Inventors: Balaji Natrajan, Spring, TX (US); Michael G. Myrah, Cypress, TX (US); Schail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 13/443,793

(22) Filed: Apr. 10, 2012

(65) Prior Publication Data
US 2013/0265867 A1    Oct. 10, 2013

(51) Int. Cl.
*H04L 12/24* (2006.01)
*H04L 12/28* (2006.01)
*H04L 12/751* (2013.01)

(52) U.S. Cl.
CPC .......... *H04L 45/025* (2013.01); *H04L 12/2419* (2013.01); *H04L 12/2422* (2013.01); *H04L 12/28* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 7,474,926 B1 | 1/2009 | Carr et al. | |
| 7,523,233 B1 | 4/2009 | Klein et al. | |
| 7,548,994 B2 | 6/2009 | Ali et al. | |
| 7,574,630 B1 | 8/2009 | Ranaweera et al. | |
| 7,668,925 B1 * | 2/2010 | Liao et al. | 709/212 |
| 7,912,995 B1 | 3/2011 | Long et al. | |
| 8,051,436 B2 | 11/2011 | Jones | |
| 8,116,226 B1 * | 2/2012 | Liao et al. | 370/254 |
| 2008/0120687 A1 * | 5/2008 | Johnson | 726/1 |
| 2009/0094620 A1 * | 4/2009 | Kalwitz et al. | 719/325 |
| 2010/0215041 A1 * | 8/2010 | Petty | 370/392 |
| 2011/0219158 A1 * | 9/2011 | Davis et al. | 710/300 |
| 2012/0173840 A1 * | 7/2012 | Patel et al. | 711/202 |
| 2012/0246521 A1 * | 9/2012 | Washiya et al. | 714/48 |
| 2012/0311224 A1 * | 12/2012 | Myrah et al. | 710/316 |

OTHER PUBLICATIONS

Symons et al., "T10/05-144r8 SAS-2 zoning," Sep. 7, 2005, 30 p.

\* cited by examiner

*Primary Examiner* — Kodzovi Acolatse
(74) *Attorney, Agent, or Firm* — Conley Rose P.C.

(57) ABSTRACT

A method includes detecting a topology change on a link in a network and determining which zone group corresponds to the topology change. The method also includes identifying a zone group in the network that is permitted to access a device on said link and determining an address of an expander that has the zone group permitted to access the device on the link. The method further includes generating an expander-targeted zoned broadcast command to report a topology change in the network. The expander-targeted zoned broadcast command has, as a destination address, the address of the expander determined to have a zone group permitted to access a device on the link.

17 Claims, 7 Drawing Sheets

SOURCE ZONE
GROUPS

|  | | 0 | 1 | 8 | 9 | 10 | 15 | 16 | 17 |
|---|---|---|---|---|---|---|---|---|---|
| DESTINATION ZONE GROUP | 0 | 0 | 1 | 0 | 0 | 0 | 0 | 0 | 0 |
|  | 1 | 1 | 1 | 1 | 1 | 1 | 1 | 1 | 1 |
|  | 8 | 0 | 1 | 0 | 0 | 0 | 0 | 0 | 1 |
|  | 9 | 0 | 1 | 0 | 0 | 0 | 0 | 1 | 0 |
|  | 10 | 0 | 1 | 0 | 0 | 0 | 0 | 0 | 0 |
|  | 15 | 0 | 1 | 0 | 0 | 0 | 0 | 1 | 0 |
|  | 16 | 0 | 1 | 0 | 1 | 0 | 1 | 0 | 0 |
|  | 17 | 0 | 1 | 1 | 0 | 0 | 0 | 0 | 0 |

EXPANDER-TARGETED ZONED BROADCAST

BACKGROUND

Network fabrics include an infrastructure that permits various initiators to access various target devices. The infrastructure may include one or more switches or other types of message-routing devices. A communication link between the fabric and an "end" device may malfunction for a variety of reasons. For example, the cable between the fabric and the device may malfunction or the end device may be physically disconnected from the fabric. Regardless of the reason for the failure of the link, some fabrics respond by broadcasting a message throughout the entire fabric alerting all initiators of a change in topology.

BRIEF DESCRIPTION OF THE DRAWINGS

For a detailed description of various examples, reference will now be made to the accompanying drawings in which:

FIG. 3 shows a route table in accordance with an example.

DETAILED DESCRIPTION

Figure 1:
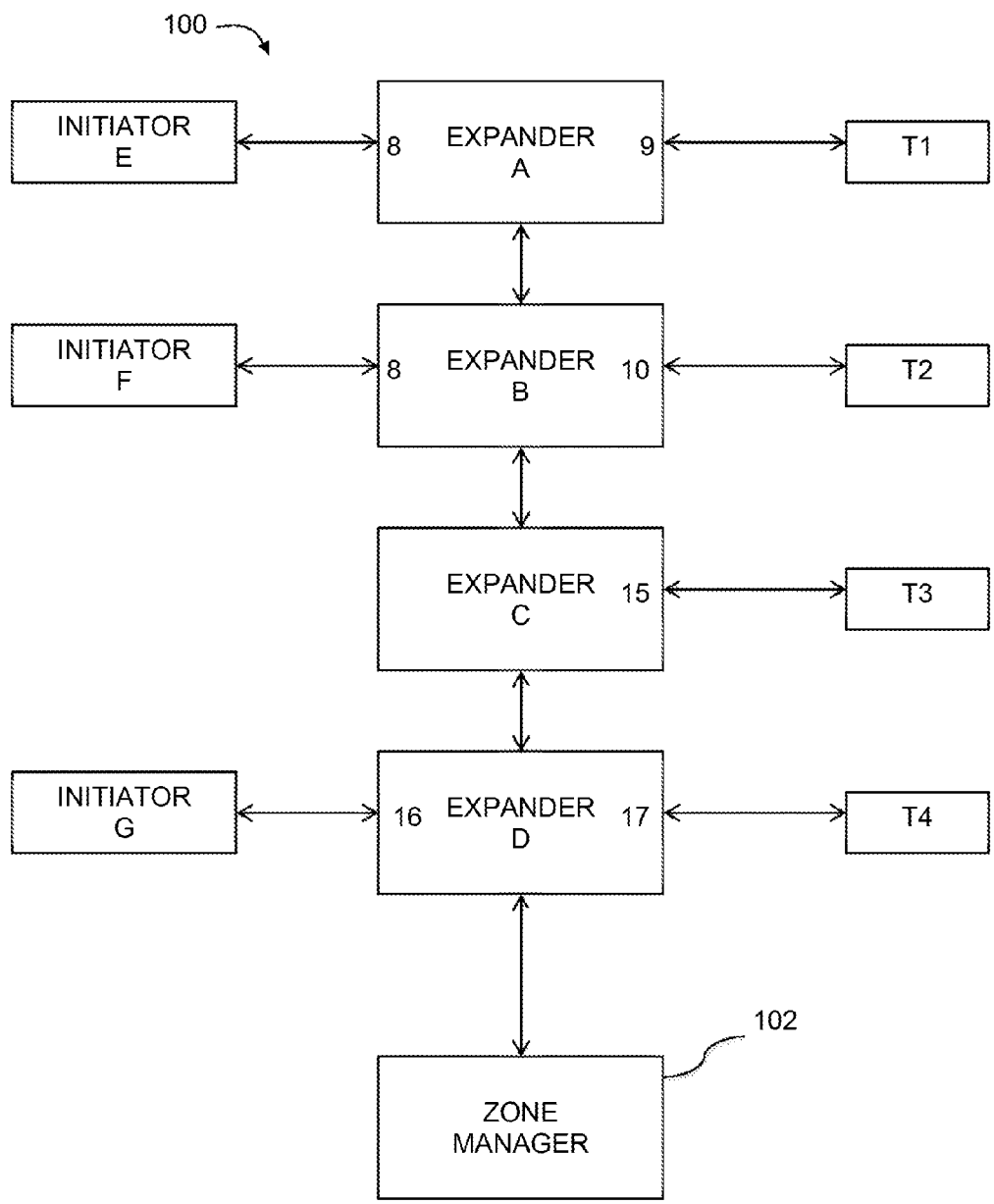
FIG. 1 shows a system in accordance with an example.

As explained above, some network fabrics are configured to broadcast a message throughout the fabric whenever a topology change is detected (e.g., a failed link). The broadcast message, however, may not specify the precise nature of the topology change and thus the initiators are forced to engage in a time-consuming discovery process to determine the fabric's new topology. Such broadcast messages cause a rippling effect of high priority activity in which each initiator (a device that can initiate a transaction with a target device) in the network perform a discovery process to ascertain the fabric topology. If, for example, a cable has an intermittent electrical problem, that one cable may cause repeated fabric-wide discovery processes to occur potentially starving out other important tasks from being performed.

Further, in some fabrics, such as the serial-attached small computer system interface (SAS)-based fabric, the various devices interconnected by way of the fabric can be portioned into zones. Devices within a given zone are permitted to communicate with one other. Two devices in different zones are not permitted to communicate with each other. When a message is broadcast fabric-wide that a change in the fabric has occurred, all initiators are forced to perform a new round of discovery, even initiators that were not zoned for the device on the link that has failed. In other words, some initiators may not at all be affected by a particular failed link because such initiators were not zoned for devices on that link anyway, yet such initiators nevertheless are forced to perform a round of discovery. Discovery is time-consuming and unnecessary for an initiator unaffected by a given link failure.

The SAS standard permits the use of an SMP ZONED BROADCAST command. The SMP ZONED BROADCAST command is configured to include a zone group of each PHY affected by the failed link(s). The SAS expander that generates the SMP ZONED BROADCAST command determines if any of the zone groups of its other PHYs are affected by the failed link(s) and, if so, devices on such PHYs are notified of the failed link by way of an SMP BROADCAST primitive. Further, the SAS expander forwards the SMP ZONED BROADCAST command to its neighboring expanders. Neighboring expanders have PHYs that are directly connected together via, for example, an electrical cable. Each such neighboring expander repeats the process of determining if any of its PHYs are affected the failed link(s) and, if so, alert devices on such PHYs as to the failed link(s). In addition, each neighboring expander also forwards the SMP ZONED BROADCAST command through all of its other PHYs except for the PHY through which the SMP ZONED BROADCAST command was received in the first place (i.e., the SMP ZONED BROADCAST command is not sent back to the expander that sent it in the first place to avoid infinite loops).

The SMP ZONED BROADCAST command functions well but requires each expander in the fabric to process the incoming command to determine whether to alert any of its connected devices of the failed link(s). That determination takes time and is performed by each expander in the fabric receiving the SMP ZONED BROADCAST command.

In accordance with the disclosed examples, however, a new type of command is described which avoids the processing activity described above by each expander receiving the command indicating a failed link. The examples described below are presented in the context of a SAS fabric for ease of discussion, but the principles can be applied to other fabric architectures as well.

Referring to FIG. 1, an example of a fabric 100 is shown comprising various expanders—Expander A, Expander B, Expander C, and Expander D. Expander A is connected to Expander B which is connected to Expander C which is connected to Expander D. Three initiator devices are also shown—Initiator E, Initiator F, and Initiator G. Initiator E is connected to Expander A. Initiator F is connected to Expander B. Initiator G is connected to Expander D. The initiator devices are able to initiate an access request to a target device T. Four target devices T are shown including T1, T2, T3, and T4. Target devices T1-T4 are each connected to Expander A-D, respectively, as shown in FIG. 1.

Figure 2:
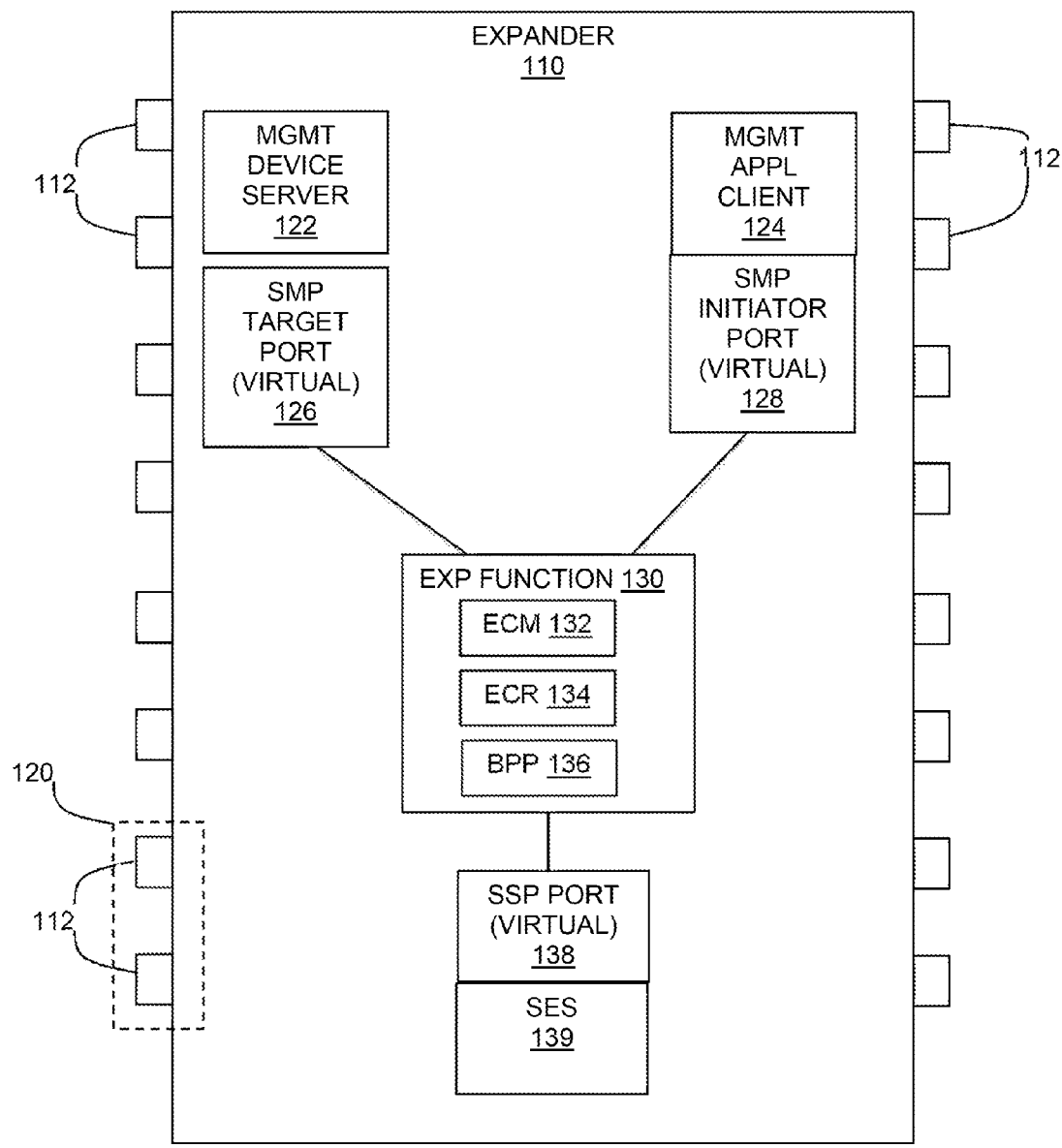
FIG. 2 shows an expander in accordance with an example.

Each Expander A-D includes one or more ports and each port includes one or more PHYs. FIG. 2 shows an example of an expander 110. The expander includes various PHYs as shown, and various of the PHYs may be grouped together as a port. A port 120 is shown for illustrative purposes. The expander 110 may have multiple ports 120.

If desired, fabric 100 of FIG. 1 may be configured without zoning. Without zoning, all initiators are able to communicate through the various Expanders A-D with all target devices T1-T4.

Zoning, however, can be implemented in the fabric 100. If zoning is implemented, the various PHYs of the various expanders are each assigned to a zone group. Each zone group is designated by, for example, a numeral in the range of 0 to 255. Zoning is managed by a zone manager 102. The zone manager 102 is shown connected to one of the expanders (Expander D). Through Expander D, the zone manager 102 is able to form and manage the various zones for the entire fabric 100. In other examples, the zone manager 102 may be connected to each of Expanders A-D, and in yet other embodiments, the zone manager 102 may be connected to an Initiator E-G.

The zone manager 102 may assign each expander PHY attached to another expander to zone group 1. The zone manager 102 may assign each expander PHY attached to an initiator device Initiator E-G or target device T1-T4 to a zone group other than 1. By way of example, the numerals 8, 9, 10, 15, 16, and 17 shown for the various Expanders A-D represent the zone groups of the PHYs connected to the initiator devices Initiator E-G and target devices T1-T4 as shown. For example, with reference to Expander A, the zone manager 102 has assigned the PHY that connects to Initiator E to zone group 8 and the PHY that connects to target device T1 to zone group 9. For Expander B, the zone manager 102 has assigned the PHY that connects to Initiator F also to zone group 8 and the PHY that connects to target device T2 to zone group 10. The zone manager 102 assigned the PHY on Expander C that connects to target device T3 to zone group 15. For Expander D, the zone manager 102 has a assigned the PHY that connects to Initiator G also to zone group 16 and the PHY that connects to target device T4 to zone group 17.

The zone manager 102 creates and manages the various zones. A zone is created by mapping one zone group to another. The zone manager 102 may implement the zone group mappings by way of a permission table. An example of a zone permission table is shown in FIG. 3.

The zone permission table 140 in FIG. 3 includes a multiple rows and multiple columns. One column is provided for each source zone group and one row is provided for each destination zone group. In some implementation, the zone groups are identical across the rows and columns as is the case in the example of FIG. 3. The zone permission table 140 in FIG. 3 illustrates rows and columns for zone groups 0, 1, 8, 9, 10, 15, 16, and 17 to match the zone groups shown in FIG. 1 (although zone group 1 not specifically shown in FIG. 1). Different or additional zone groups may be provided as well. The zone groups labeled across the top of the table are the source zone groups and the zone groups down the left side are the destination zone groups.

Each entry in zone permission table 140 pertains to a corresponding zone groups in row and column for that particular entry. Each entry contains either a 0 or a 1 in various embodiments. A 1 may specify that the source zone group has permission to access the destination zone group. That is, for a bit in the zone permission table 140 set to 1, connection requests between PHYs in the corresponding zone groups are permitted. A 0 may specify that the source zone group does not have permission to access the destination zone group. That is, for a bit in the zone permission table 140 set to 0, connection requests between PHYs in the corresponding zone groups are rejected.

Zone group 1 is permitted to access all other zone groups and thus the column under source zone group 1 is all 1's and the row for destination zone group 1 also is all 1's. Zone group 0 is not permitted to access any zone groups and thus the entries corresponding to source and destination zone group 0 is all 0's. Most of the rest of the entries in the zone permission table are 0, except for a few 1 entries. For example, under source zone group 17, a 1 entry is present corresponding to destination zone group 8, thereby permitting connection requests between PHYs of zone groups 17 and 8. Zone group 17 is on expander D and zone group 8 is on expander A. Thus, initiator A (which is connected to zone group 8 on expander A) is able to communicate with target device T4 attached to expander D (and which is connected to zone group 17) because zone groups 8 and 17 have been zoned together.

Figure 4:
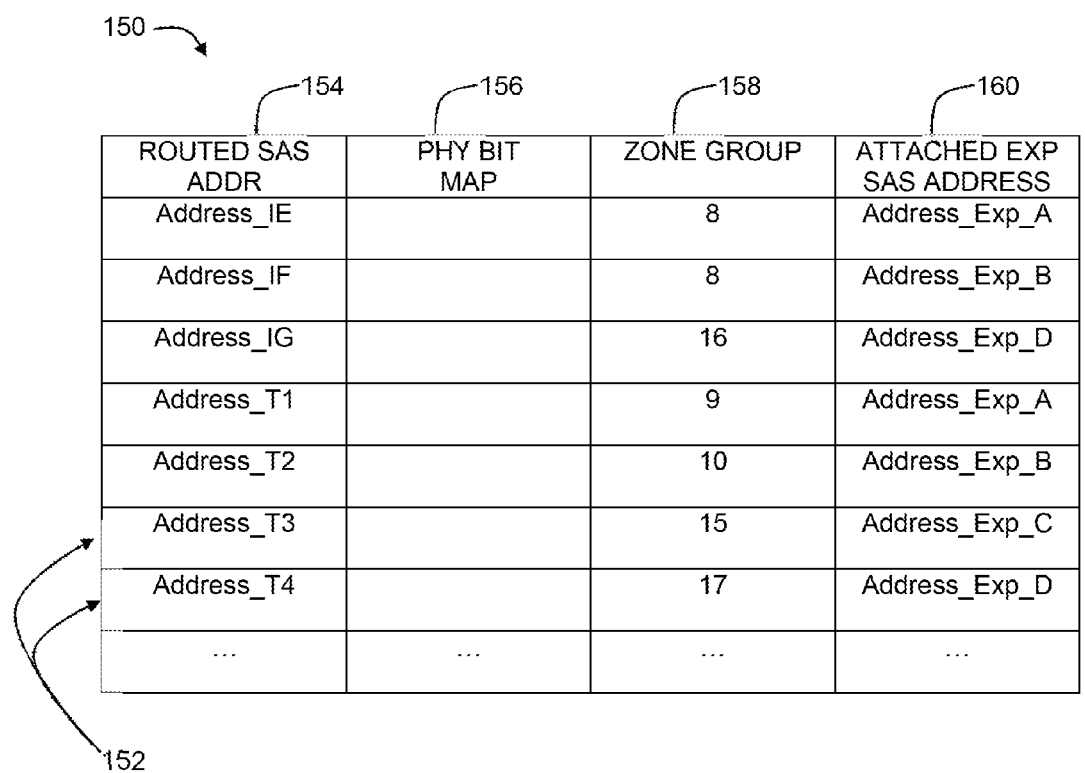
FIG. 4 shows a permission table in accordance with an example.

FIG. 4 illustrates an example of zoning expander route table 150. The route table 150 in FIG. 4 includes multiple rows 152. Each row has multiple entries including a routed SAS address 154, a PHY bit map 156, a zone group field 158, and an attached expander SAS address 160. The routed SAS address 154 is the address of an initiator or target device. The PHY bit map 156 indicates the expander PHY(s) to which connection requests to the corresponding routed SAS address 154 may be forwarded. In the PHY bit map, a 1 for a given PHY may indicate that the expander PHY is used for forwarding connection requests, while a 0 may indicate that the expander PHY is not used for forwarding connection requests. The values for the PHY bit map are not shown in FIG. 4 to simplify the discussion. The zone group field 158 indicates the zone group, if any, of the PHY with the routed SAS address.

The attached expander SAS address 160 specifies the SAS address of the expander to which the initiator or target device having the corresponding routed SAS address 154 is directly connected.

In accordance with various implementations, each expander A-D in the fabric is able to determine which specific expander has a zone group that needs to know about a failed link. The expanders use the zone permission table 140 and the zoning expander route table 150 to make this determination as discussed below and to form a message to send to such targeted expanders alerting the expander of the failed link.

Figure 5:
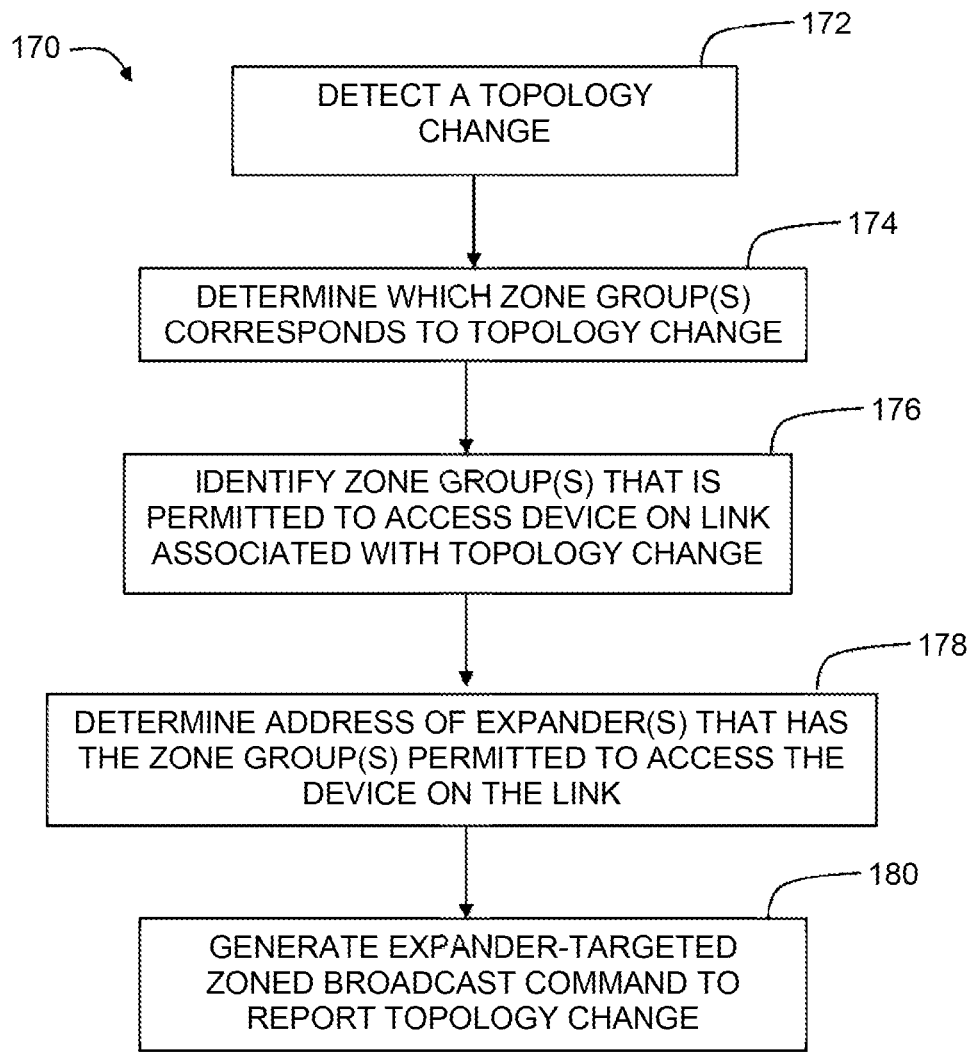
FIG. 5 shows a method in accordance with an example.

FIG. 5 provides a method 170 that illustrates an example of such a technique. Each expander A-D in the fabric is able to perform the various actions in method 170 and do so in the order shown, or in a different order.

At 172, method 170 includes detecting a topology change. The topology change broadly refers to any type of change in the status of a link between an expander and its connected initiator E-G or target device T1-T4. An example of a topology change may be an inoperative link such as an inoperative cable, a removed target device T1-T4 or initiator device E-G, and the like. The change in topology may mean that the link is inoperative. As explained above, the PHY associated with the failed link may be zoned with another PHY on another expander. The expander that has (and detects) the failed link is referred to as the "originating" expander. In addition to detecting the topology change (172), the originating expander also performs 174-180 to determine any other expanders) in the fabric 100 that are affected by the failed link. An "affected" expander means an expander that has a zone group that is zoned to the zone group of the PHY of the failed link.

Figure 6:
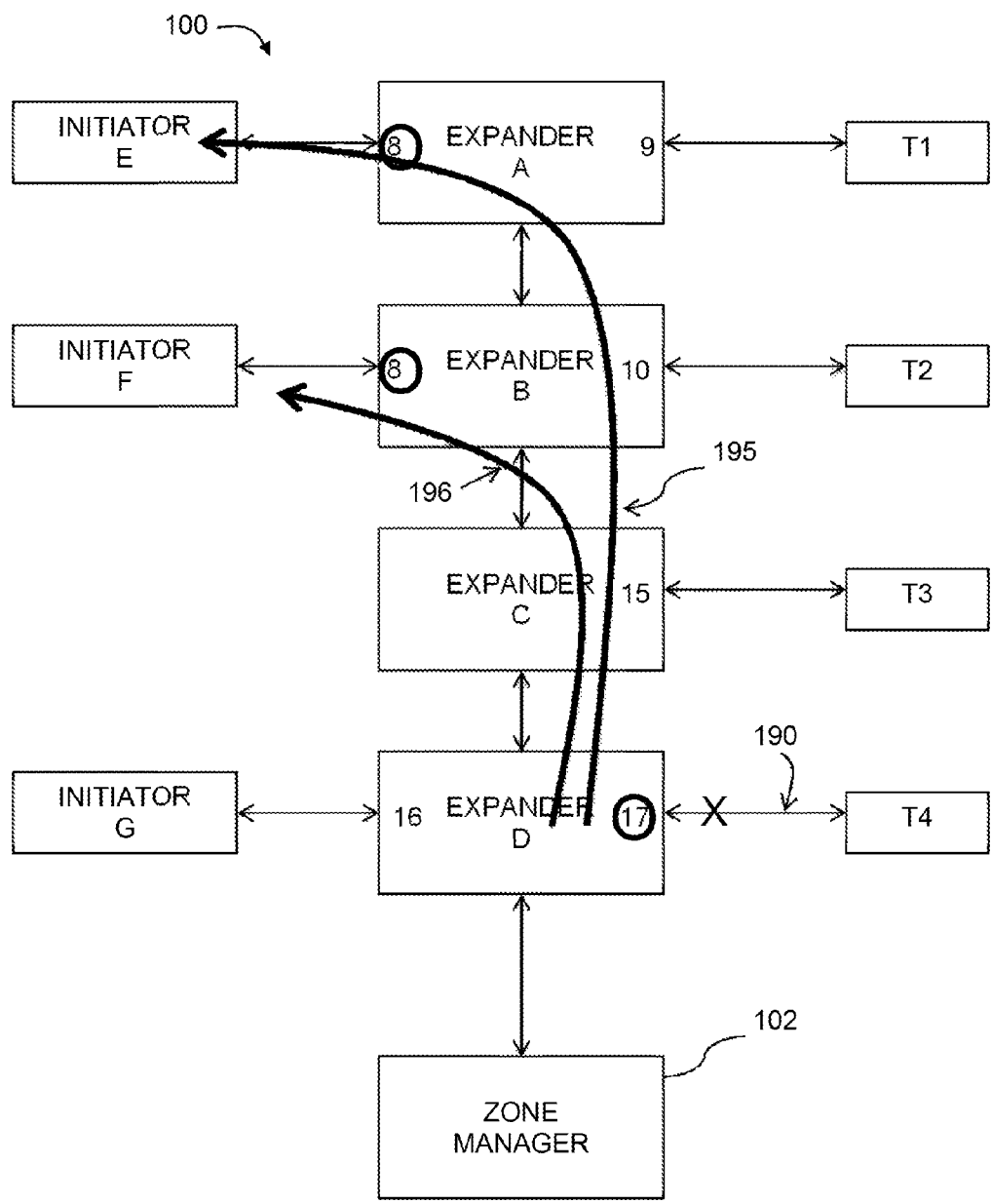
FIG. 6 provides an illustrative example.

FIG. 6 is similar to FIG. 1 and will be used to provide an example as method 170 is discussed. In the example of FIG. 6, the link 190 connecting expander D to target device T4 has failed (as denoted by the "X"). Expander D detects the failure and performs method 170. The PHY on Expander D that is connected to target device T4 is assigned to zone group 17. As noted above and is shown in the example zone permission table 140, zone group 17 is zoned to zone group 8. From the route table in FIG. 4, it can be determined that the Initiators E and F have zone group 8 and they are attached to Expanders A and B. That zone groups 17 and 8 are zoned together is emphasized in FIG. 6 through the circles around those zone group numbers. The PHY on expander A assigned to zone group 8 is connected to Initiator E. Normally, Initiator E is able to communicate with target device T4 through the various expanders. However, T4 is now unavailable to Initiator E because of the failed link 190. Thus, originating Expander D performs the method 170 to detect the failed link, determines that expander A is affected by the failed link, and generates and sends a message to Initiator E to inform the Initiator E of a topology change that affects Initiator E. As a result, initiator E will perform a round of discovery and determine that target device T4 is no longer available.

At 174 in FIG. 5, the method 170 comprises determining which zone group of the expander that has detected the topology change (e.g., failed link) corresponds to the topology change. The Expander D makes this determination by examining in the example of FIG. 6 which of its zone groups is assigned to the PHY experiencing the topology change. In this example, the zone group 17 is the zone group of the PHY experiencing the topology change.

At 176, the expander identifies any other zone group, if any, that is zoned to the zone group of the topology change. That is, any other zone group is identified having a PHY that is permitted to access the PHY of the zone group determined at 174 (the zone group connected to the detected topology change). The expander makes the determination in 176 by accessing the zone permission table 140.

In the example of FIG. 6, Expander D consults the zone permission table 140 (FIG. 4) and accesses source zone group 17 (which is the zone group determined at 174 corresponding to the detected topology change). Expander D then accesses the column for zone group 17 and determines if any 1 bits are present. In the zone permission table 140 of FIG. 4, a 1 is present associated with zone group 8. Thus, Expander D determines that zone group 8 has been zoned to zone group 17. Moreover, zone group 8 should be informed of that a topology change has occurred so that the corresponding Initiator E and F can perform a round of discovery to determine the changed topology that affects Initiator E and F.

At 178, the method 170 comprises determining the address of each expander that has the zone group permitted to access the device on the non-operational link (link 190 in the Example of FIG. 6). The expander performs this action by again accessing the zoning expander route table 150 (FIG. 4) with the zone group determined at 176. In the example of FIG. 6, the zone group from 176 is zone group 8, which is the zone group that is affected by the non-operational link 190 (e.g., devices on zone group 8 have been zoned to target devices on the non-operational link but now cannot access such target devices). Expander D identifies the SAS address(es) of the expander(s) that has PHYs assigned to zone group 8. Using zoning expander route table 150, Expander D ascertains the attached expander SAS address for expanders A and B, which are denoted in the zoning expander route table 150 as Address_Exp_A and Address_Exp_B.

Armed with the SAS addresses of the affected expanders (Expanders A and B), the originating expander (Expander D in the example) generates at 180 an EXPANDER-TARGETED ZONED BROADCAST command to report the occurrence of a topology change. The EXPANDER-TARGETED ZONED BROADCAST command includes as a destination address, the address of the affected expander and the type of broadcast. In some implementations, the originating expander generates an EXPANDER-TARGETED ZONED BROADCAST command for each affected expander. In the example of FIG. 6, Expander D generates two EXPANDER-TARGETED ZONED BROADCAST Commands—one with the SAS address of Expander A as a destination address and another with the SAS address of Expander B as a destination address.

Each EXPANDER-TARGETED ZONED BROADCAST command is transmitted through the fabric 100 to the targeted expander (i.e., the expander whose SAS address corresponds to the destination address in the command. The track of the EXPANDER-TARGETED ZONED BROADCAST commands in the example of FIG. 6 is depicted by arrows 195 and 196. Arrow 195 depicts that the command for Expander A passes through Expanders C and B, and arrow 196 depicts that the command for Expander B passes through Expander C. Neither command targets Expander C, and thus Expander C simply routes the command along in accordance with its routing protocol.

A conventional SMP ZONED BROADCAST is processed by each expander that receives the command as explained above. Such processing includes determining whether any of the expander's PHYs are affected by detected topology change. By contrast, the EXPANDER-TARGETED ZONED BROADCAST command is not processed in that manner by any intermediate expanders that receive the command, but that are not targeted by the command (e.g., do not have a SAS address that matches the destination address in the command).

Further, in a conventional SMP ZONED BROADCAST command, the each expander receiving the command also broadcasts out the command through all of its PHYs other than the PHY on which the command was received. This repeat broadcast occurs, because the expander ultimately affected by the topology change is not known by the expander that receiving the command. The EXPANDER-TARGETED ZONED BROADCAST command, however, is earmarked for a specific expander that is known to be affected by the detected topology change. That being the case, the EXPANDER-TARGETED ZONED BROADCAST command does not broadcast out the command through any of its PHYs. For example, Expander B does not broadcast out the EXPANDER-TARGETED ZONED BROADCAST command that targets Expander B. Instead, the expander targeted by an EXPANDER-TARGETED ZONED BROADCAST command sends a corresponding SMP BROADCAST primitive of the type specified in the EXPANDER-TARGETED ZONED BROADCAST command on its PHYs assigned to the zone group identified in the command.

Referring again to FIG. 2, each expander 110 includes logic comprising a management sever device (MSD) 122 and a management application client (MAC) 124 as well as an SMP target port (virtual) 126 and an SMP initiator port (virtual) 128. The SMP target port (virtual) 126 and SMP initiator port (virtual) 128 connect to an expander function 130. The expander function 130 includes an expander connection manager (ECM) 132, an expander connection router (ECR) 134, and a broadcast propagation processor (BPP) 136. The BPP 136 couples to an SSP port (virtual) 138 and SCSI Enclosure Services (SES) 139.

For each expander that receives an EXPANDER-TARGETED ZONED BROADCAST command targeting that specific expander, the management device server 122 processes the command to cause initiators on the affected zone groups to conduct a new round of discovery. The management application client 124 in the originating expander generates the EXPANDER-TARGETED ZONED BROADCAST command.

The ECM 132 maps a destination SAS address in a connection request to a destination PHY using direct, subtractive, or table routing methods. The ECM 132 may also arbitrate and assign or deny path resources for connection requests following SAS arbitration and pathway recovery rules. The ECR 134 may route messages between pairs of expander PHYs as configured by the ECM. Enough routing resources are provided to support at least one connection. The BPP 136 may receive broadcasts from each expander PHY or from the management device server 122 on behalf of an expander logical PHY and requests transmission of those broadcasts on all expander ports except the expander port from which the broadcast was received. The SCSI Enclosure Services 139 provide monitoring and diagnostic capability for power, cooling and other peripheral elements in the enclosure. The SES 139 uses a specialized set of SCSI commands classified as SSP commands (as opposed to SMP commands such as SMP ZONED BROADCAST). Accordingly, expanders that provide SES services 139 have a virtual SSP port 138.

Figure 7:
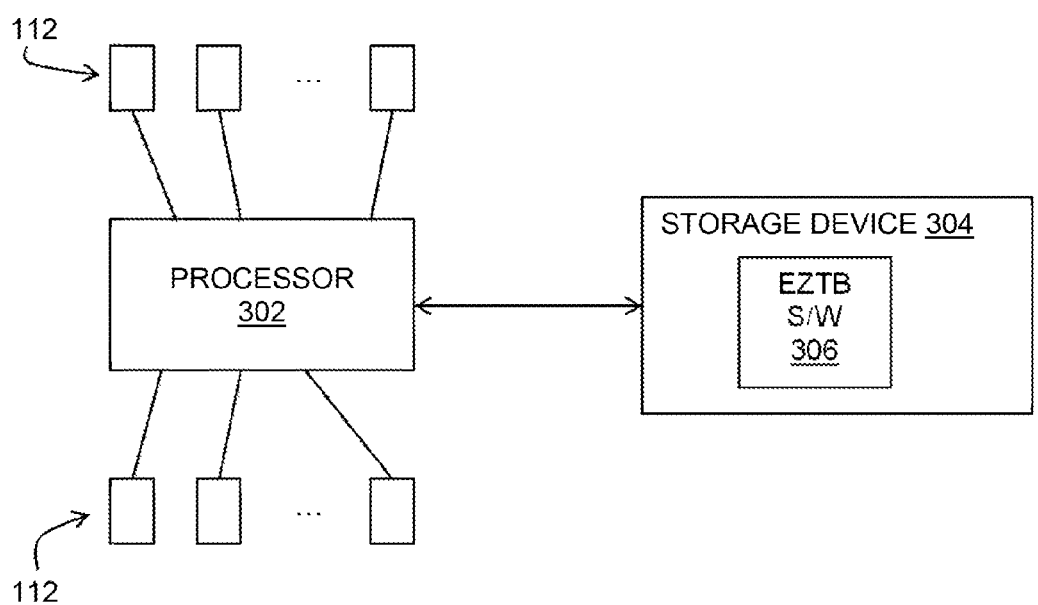
FIG. 7 shows an expander in accordance with another example.

FIG. 7 illustrates that each expander (e.g., Expanders A-C) may comprise a processor 302 to which the various PHYs 112 may be coupled. A storage device 304 also is shown coupled to the processor 302. The storage device 304 may comprise any type of non-transitory storage such volatile memory (e.g., random access memory), non-volatile storage (e.g., Flash memory, hard drive, etc.), or combinations thereof. Expander-Targeted Zoned Broadcast (ETZB) software 306 is stored on the storage device 304 and accessible to the processor 302 for execution. Execution of the ETZB software 306 provides the expander with some or all of its functionality such as the functionality described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   detecting a topology change on a link in a network;
   determining a first zone group that includes the topology change;
   identifying a second zone group in the network that is permitted to access a device on said link;
   determining an address of an expander that has the second zone group permitted to access the device on said link, wherein determining the address comprises accessing a route table using the second zone group that is identified by a permission table, wherein the permission table identifies which zone groups are permitted to access devices on links for other zone groups, wherein said route table specifies expander addresses associated with each zone group; and
   generating an expander-targeted zoned broadcast command to report the topology change in the network, said expander-targeted zoned broadcast command having, as a destination address, the address of the expander determined to have the second zone group permitted to access the device on said link.

2. The method of claim 1 wherein determining the first zone group that includes the topology change comprises accessing the route table to identify a zone group for the link.

3. The method of claim 2 wherein the route table includes a plurality of entries and each entry includes a routed address, a PHY bit map, a zone group, and an address of an attached expander.

4. The method of claim 1 wherein identifying the second zone group comprises accessing the permission table.

5. The method of claim 1 wherein detecting the topology change comprises detecting that the link is inoperative.

6. The method of claim 1 further comprising:
   receiving, by a second expander, the expander-targeted zoned broadcast command;
   determining, by the second expander, whether any zone groups of the second expander are zoned to a source zone group included in the expander-targeted zoned broadcast command; and
   sending a broadcast primitive message of a type specified in the received message across PHYs of such zone groups without forwarding the expander-targeted zoned broadcast command to any neighboring expanders.

7. An expander, comprising:
   a plurality of ports, each port having at least one PHY; and
   a permission table that identifies which zones are permitted to access devices on links for other zones;
   a processor configured to receive an indication that a link for a PHY of a first zone is non-operational and to generate an expander-targeted zoned broadcast command based on a route table that includes a plurality of entries, each entry mapping a routed address to an attached expander address, wherein said expander-targeted zoned broadcast command includes as a destination address an address of another expander that includes a PHY of a second zone that is mapped to the first zone, wherein the processor is configured to access the route table based on the zones identified from the permission table to determine the address of the expander and to include that address in the expander-targeted zoned broadcast command as the destination address.

8. The expander of claim 7 wherein each entry in the route table also includes a zone group field, and the processor accesses a zone group field of the route table to determine a zone group assigned to the PHY of the non-operational link.

9. The expander of claim 8 wherein the processor accesses the permission table based on a zone group determined from the route table to determine whether another zone group is associated with the zone group determined from the route table.

10. The expander of claim 7 wherein the permission table specifies whether each pair of multiple pairs of zone groups is permitted access to each other.

11. The expander of claim 7 wherein the processor inserts a value into the expander-targeted zoned broadcast command to differentiate the expander-targeted zoned broadcast command from an SMP ZONE BROADCAST command.

12. The expander of claim 7 further comprising a management server device coupled to each PHY, said management server device receives a targeted zoned broadcast command from another expander, determines whether the targeted zoned broadcast command has a destination address that matches the address of the expander and sends a broadcast primitive message of a type specified in the received targeted zoned broadcast command out of a PHY that is zoned to a non-operational PHY of another expander and does not broadcast the broadcast primitive message nor forward the targeted zoned broadcast command out through any other PHYs.

13. The expander of claim 7 wherein each entry in the route table includes a routed address, a PHY bit map, and a zone group.

14. A non-transitory storage device storing software that, when executed by a processor, causes the processor to:
   detect a topology change on a link in a network;
   determine a first zone group that includes the topology change;
   identify a second zone group in the network that is permitted to access a device on said link;
   determine an address of an expander that has the second zone group permitted to access the device on said link, wherein the address is determined to access a route table using a zone group that is identified by a permission table, wherein the permission table identifies which zone groups are permitted to access devices on links for other zone groups, wherein the route table specifies expander addresses associate with each zone group; and
   generate an expander-targeted zoned broadcast command to report a topology change in the network, said expander-targeted zoned broadcast command having, as a destination address, the address of the expander determined to have the second zone group permitted to access a device on said link.

15. The non-transitory storage device of claim 14 wherein the software causes the processor to determine the first zone group that includes the topology change by causing the processor to access the route table to identify a zone group for the link, and wherein the software causes the processor to identify the second zone group by causing the processor to access the permission table.

16. The non-transitory storage device of claim 15 wherein the route table includes a plurality of entries and each entry includes a routed address, a PHY bit map, a zone group, and an address of an attached expander.

17. The non-transitory storage device of claim 14 wherein the software causes the processor to:
  receive the expander-targeted zoned broadcast command;
  determine whether any zone groups of an expander that originated the command so received are zoned to a source zone group included in the received expander-targeted zoned broadcast command; and
  send a broadcast primitive message of a type specified in the received expander-targeted zoned broadcast command across PHYs of such zone groups without forwarding the expander-targeted zoned broadcast command to any neighboring expanders.

* * * * *